US012763712B2

(12) United States Patent
Letot

(10) Patent No.: US 12,763,712 B2
(45) Date of Patent: Oct. 13, 2026

(54) MOTOR CONTROL SYSTEM FOR DETERMINING AN OPERATING POINT FOR CONTROLLING AN ELECTRIC MOTOR

(71) Applicant: Hella GmbH & Co. KGaA, Lippstadt (DE)

(72) Inventor: Jeremy Letot, Toulouse (FR)

(73) Assignee: Hella GmbH & Co. KGaA, Lippstadt (DE)

( * ) Notice: Subject to any disclaimer, the term of this patent is extended or adjusted under 35 U.S.C. 154(b) by 258 days.

(21) Appl. No.: 18/612,045

(22) Filed: Mar. 21, 2024

(65) Prior Publication Data

US 2024/0235447 A1 Jul. 11, 2024

Related U.S. Application Data

(63) Continuation of application No. PCT/EP2021/075999, filed on Sep. 22, 2021.

(51) Int. Cl.
*H02P 23/14* (2006.01)
*H02J 7/00* (2026.01)
*H02P 25/03* (2016.01)

(52) U.S. Cl.
CPC .............. *H02P 23/14* (2013.01); *H02J 7/855* (2026.01); *H02P 25/03* (2016.02)

(58) Field of Classification Search
CPC .......... H02P 23/14; H02P 25/03; H02P 21/14; H02P 2101/45; H02P 21/22; H02J 7/0063; B62D 5/046; B62D 5/0484; B62D 5/0481
USPC ....................... 318/139, 700, 400.01, 400.15
See application file for complete search history.

(56) References Cited

U.S. PATENT DOCUMENTS

| | | | | |
|---|---|---|---|---|
| 7,023,168 | B1 * | 4/2006 | Patel | H02P 21/0089 318/722 |
| 8,427,087 | B2 * | 4/2013 | Yamada | H02P 27/08 318/400.02 |
| 9,768,719 | B2 * | 9/2017 | Campbell | H02P 21/0089 |
| 10,756,619 | B2 * | 8/2020 | Ordasi | B62D 5/0463 |
| 2006/0055363 | A1 | 3/2006 | Patel et al. | |

FOREIGN PATENT DOCUMENTS

| | | | |
|---|---|---|---|
| DE | 102015224586 | A1 | 6/2017 |
| WO | 2016198588 | A1 | 12/2016 |

* cited by examiner

*Primary Examiner* — David Luo
(74) *Attorney, Agent, or Firm* — Husch Blackwell LLP

(57) ABSTRACT

A motor control system determines an operating point for controlling an electric motor in an electric system that includes a battery and an electronic control unit. The motor control system includes a calibrator having an input for receiving a battery voltage of the battery, a motor speed, and a requested torque of the electric motor. The calibrator calculates a modified speed based on the received battery voltage, motor speed and requested torque. An operating point controller has an input for receiving a fixed battery voltage reference, the modified speed and the requested torque. The operating point controller determines the operating point for controlling the electric motor based on the received fixed battery voltage reference, the modified speed, and the requested torque.

11 Claims, 16 Drawing Sheets

MOTOR CONTROL SYSTEM FOR DETERMINING AN OPERATING POINT FOR CONTROLLING AN ELECTRIC MOTOR

CROSS REFERENCE

This application claims priority to PCT Application No. PCT/EP2021/075999, filed Sep. 22, 2021, the entirety of which is hereby incorporated by reference.

FIELD OF THE INVENTION

The invention relates to a motor control system for determining an operating point for controlling an electric motor, a control system having the motor control system, an electronic system having the control system, a vehicle having the electronic system, a method for determining an operating point for controlling an electric motor, a computer program and a computer-readable data carrier.

BACKGROUND OF THE INVENTION

It is an object of the invention to provide a way by means of which the most optimal operating points for an electric motor operating at different speeds, torques, voltages, temperatures, etc. may be determined while still satisfying CPU load (calculation time) and memory (size of variables) constraints.

BRIEF SUMMARY OF THE INVENTION

The features and details described in connection with the motor control system of the invention apply in connection with the control system of the invention, the electronic system of the invention, the vehicle of the invention, the method of the invention, the computer program of the invention and the computer-readable data carrier of the invention, so that regarding the disclosure of the individual aspects of the invention it is or can be referred to one another.

According to a first aspect of the invention, the above object is solved by means of a motor control system for determining an operating point for controlling an electric motor in an electric system comprising a battery and an electronic control unit.

The motor control system comprises a calibrator having an input for receiving a battery voltage of the battery and a motor (or rotor) speed and a requested torque of the electric motor, the calibrator being configured to calculate a modified speed based on the received battery voltage, motor speed and the requested torque.

The motor control system further comprises an operating point controller having an input for receiving a fixed battery voltage reference, the modified speed and the requested torque, the operating point controller being configured for determining the operating point for controlling the electric motor based on the received fixed battery voltage reference, the modified speed and the requested torque.

The identified disadvantage in the prior art is that equations are simplified in a way that all operating points are not optimum. However, using raw equations requires a computer's processor which is not reasonable for many applications, in particular automotive applications.

The invention now proposes to include a calibrator in a motor control system to change the operating point controller's inputs. The calibrator, just as the operating point controller, may be understood as modules of the motor control system, which may be implemented as computer codes, in particular algorithms, to be executed on a computer and/or as electric circuits executing their function.

The equations of the operating point controller are simplified but the calibrator will variate the inputs to oblige the operating point controller to provide the most efficient operating points. A modification of the raw equations by means of performing variables with constants and (more or less) complex functions allows to decompose the different calculations to make the whole process faster to compute.

Despite requiring (reasonable) additional CPU load (few micro-seconds) and memory (few kilo-bytes), the motor control system allows more flexibility, which could permit to choose a balance between different CPU constraints and motor control performances. All operating points can be optimized without having to upgrade the CPU.

In particular, the operating point is defined by a current to be applied through each of the phases of the electric motor.

Moreover, in particular, the motor control system further comprises a control loop configured for receiving the determined operating point, comparing the determined operating point to a measured current and output a voltage request.

Further, in particular, the electric motor is a brushless alternating current motor.

According to a second aspect of the invention, the above object is solved by means of a control system comprising the motor control system according to the first aspect of the invention, whereby the control system further comprises a power stage control system connected to the motor control system.

In particular, the power stage control system is configured to transform a voltage request received from the motor control system into duty cycles to command switches of a power stage of the electronic control unit.

According to a third aspect of the invention, the above object is solved by means of an electronic system comprising a mechanical system and an electric system, the electric system having the control system according to the second aspect of the invention.

In particular, the electronic system is an electronic vehicle system. In other words, the electronic system may be from an automotive application.

Moreover, in particular, the electronic system is an electronic power steering system. However, other applications in vehicles, such as vehicle electric traction systems, can be implemented as well.

According to a fourth aspect of the invention, the above object is solved by means of a vehicle comprising the electronic system according to the third aspect of the invention.

According to a fifth aspect of the invention, the above object is solved by means of a method for determining an operating point for controlling an electric motor in an electric system comprising a battery and an electronic control unit, the method comprising the steps of: receiving a battery voltage of the battery, a motor speed and a requested torque of the electric motor, calculating a modified speed based on the received battery voltage, motor speed and requested torque, receiving a fixed battery voltage reference, the modified speed and a requested torque, and determining the operating point for controlling the electric motor based on the received fixed battery voltage reference, the modified speed and the requested torque.

In particular, the method further comprises the steps of comparing the determined operating point to a measured current and outputting a voltage request.

Moreover, in particular, the method further comprises the steps of transforming a voltage request into duty cycles and correspondingly commanding switches of a power stage of the electronic control unit.

According to a sixth aspect of the invention, the above object is solved by means of a computer program comprising instructions which, when the program is executed by a computer, cause the computer to carry out the method according to the fifth aspect of the invention.

According to a seventh aspect of the invention, the above object is solved by means of a computer-readable data carrier having stored thereon the computer program according to the sixth aspect of the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Throughout FIGS. 1-16, alike elements are referred to with the same reference number.

Figure 1:
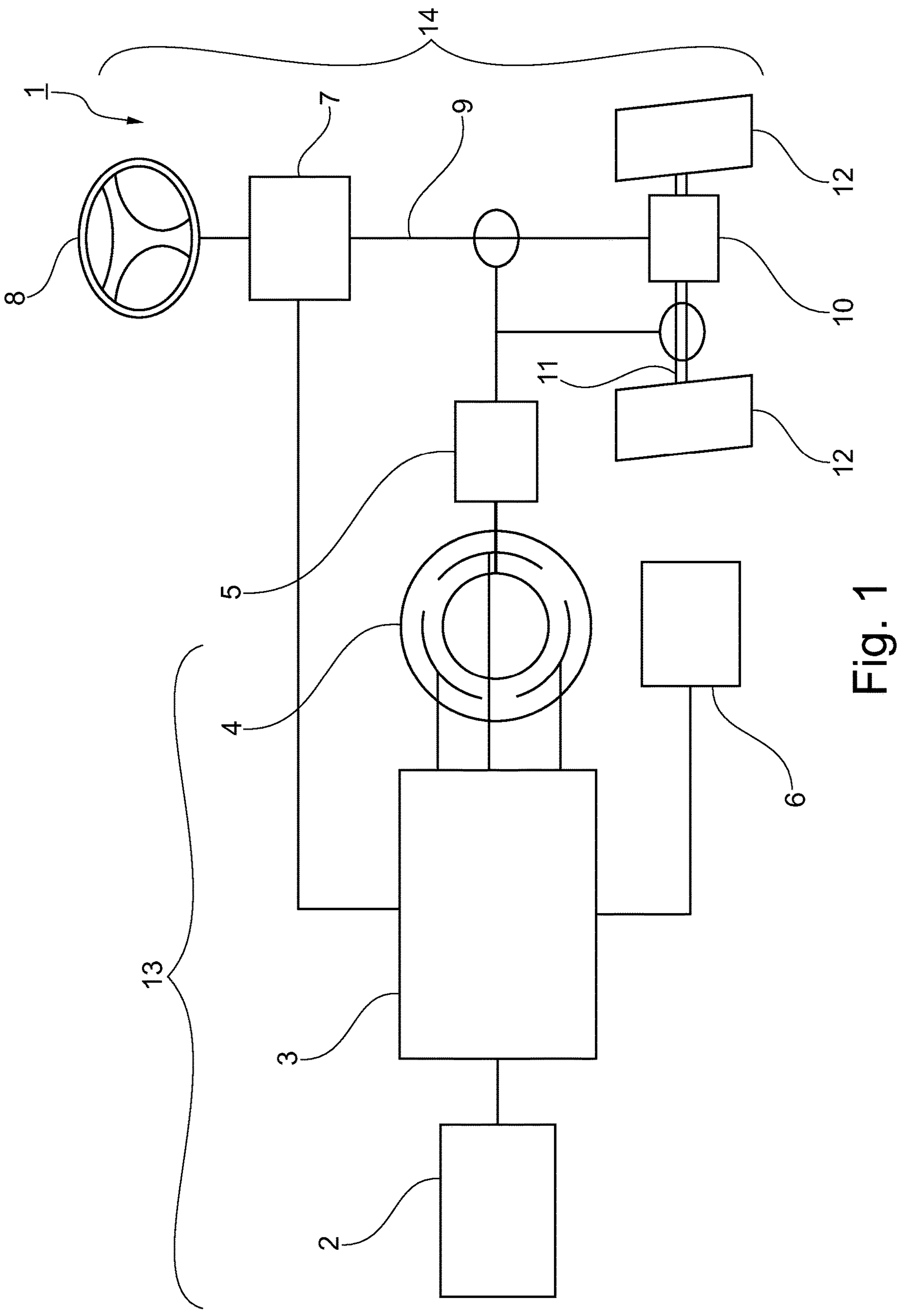
FIG. 1 shows an electronic power steering system.
Figure 2:
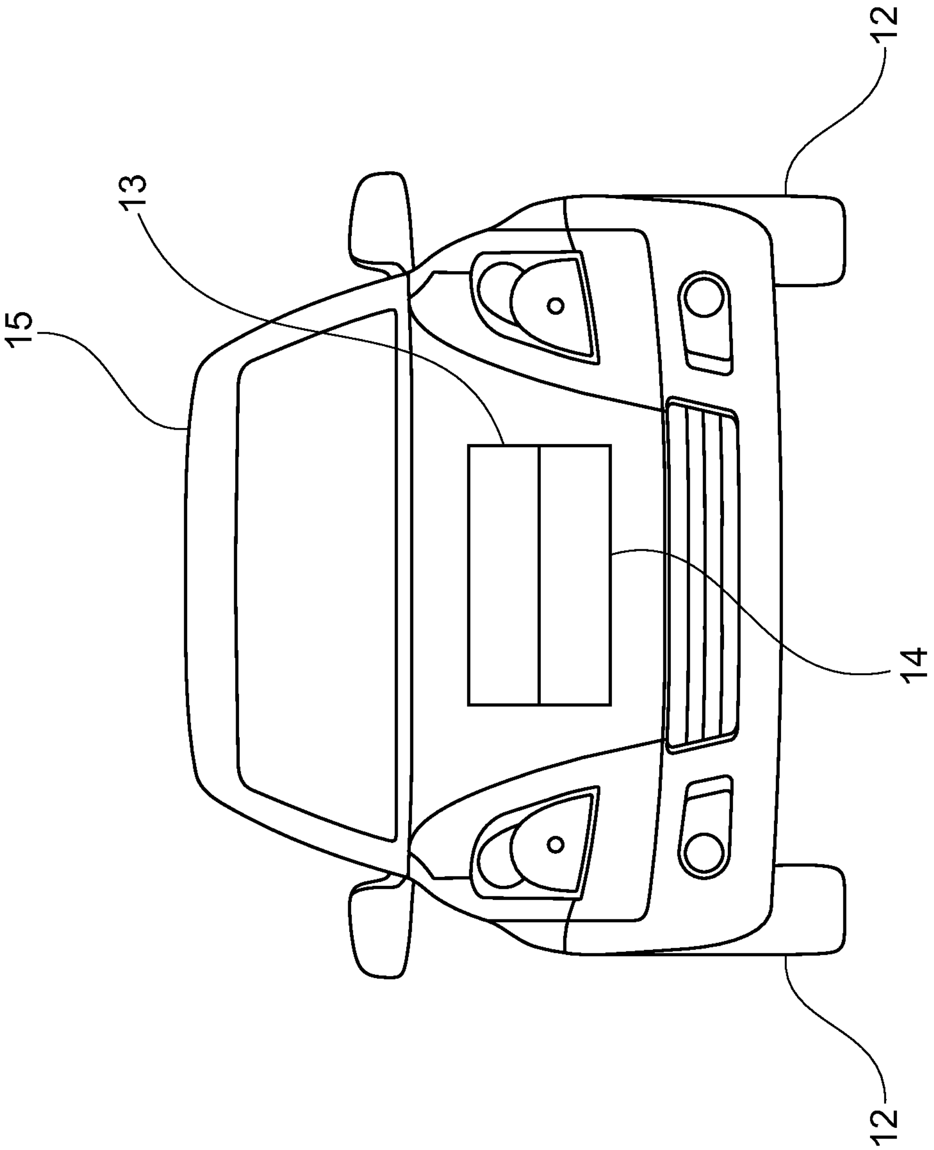
FIG. 2 shows a vehicle having the electronic power steering system of FIG. 1.

FIG. 1 depicts an electronic (vehicle) system 1 in the form of an electronic power steering (EPS) system 1 for a vehicle 15 (see FIG. 2). The electronic power steering system 1 comprises a mechanical system 14 and an electric system 13. The mechanical system 14 includes a torque sensor 7, a steering wheel 8, a column 9, a pinion 10, a rack 11 and wheels 12. The electric system 13 includes an electric motor 4, which in this case is a brushless alternating current motor (BLAC motor), a battery 2, an electronic control unit (ECU) 3 and at least one sensor, such as the depicted motor position sensor 6, thereby forming the so-called powerpack 13. A gearbox 5 of the EPS system 1 makes the junction between both systems 13, 14.

When the steering wheel 8 is rotated, the requested torque is measured by the torque sensor 7, and the powerpack 13 accordingly provides torque in the same direction which helps the driver to steer the vehicle 15 (schematically depicted in FIG. 2 with systems 13, 14 inside of the vehicle 15).

The torque provided by the powerpack 13 is multiplied by the gearbox 5 and is applied on the column 9 or the rack 11 according to the type of vehicle (truck or small city car). The speed of the steering wheel 8 (imposed by the driver) is multiplied by the gearbox 5 on the powerpack's motor 4. Therefore, EPS motors 4 are used in a big range of speed and of torque as well.

Figure 3:
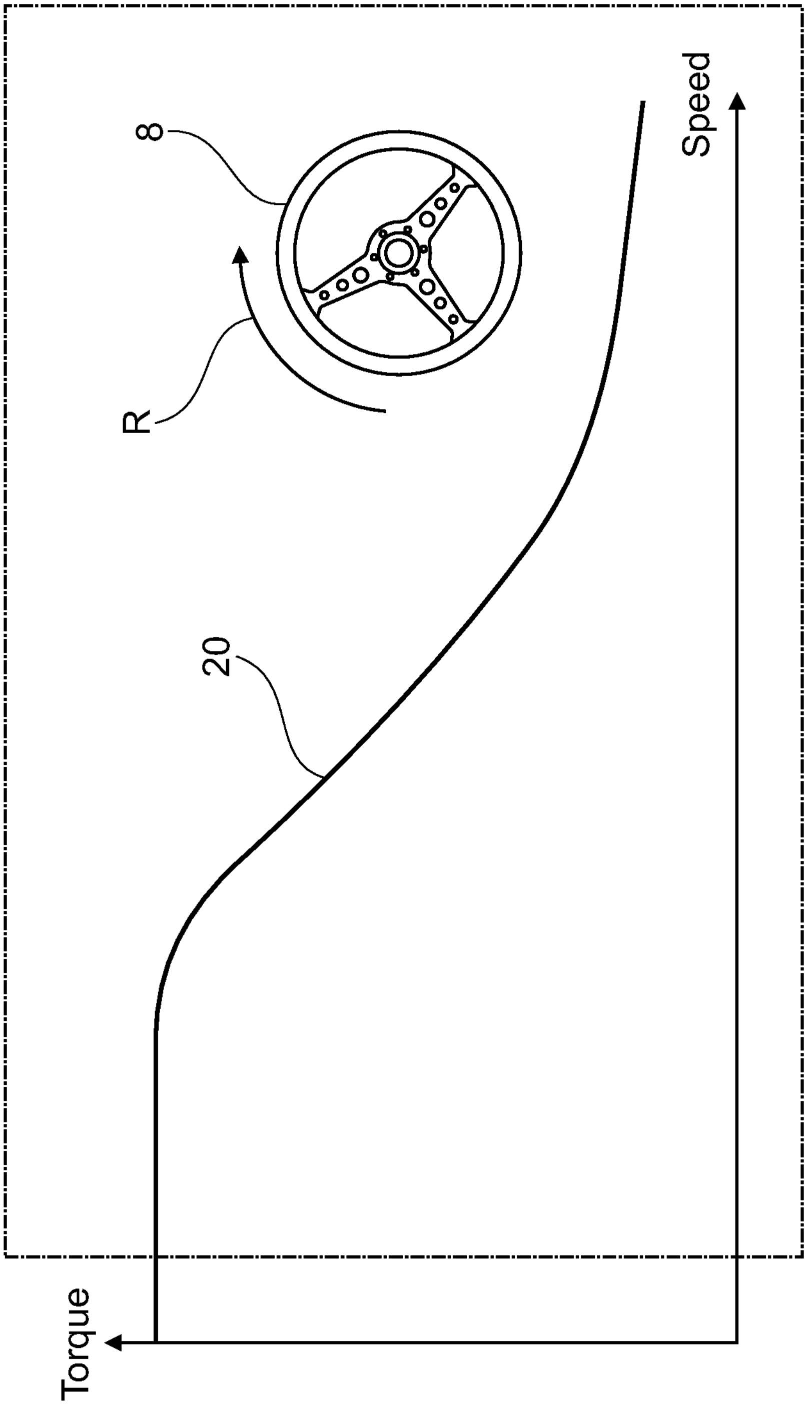
FIG. 3 shows a torque-speed-graph for the electronic power steering system of FIG. 1.

FIG. 3 depicts the typical shape of the first curve 20 representing how much torque (assistance) is available depending on the speed of the steering wheel 8.

Figure 4:
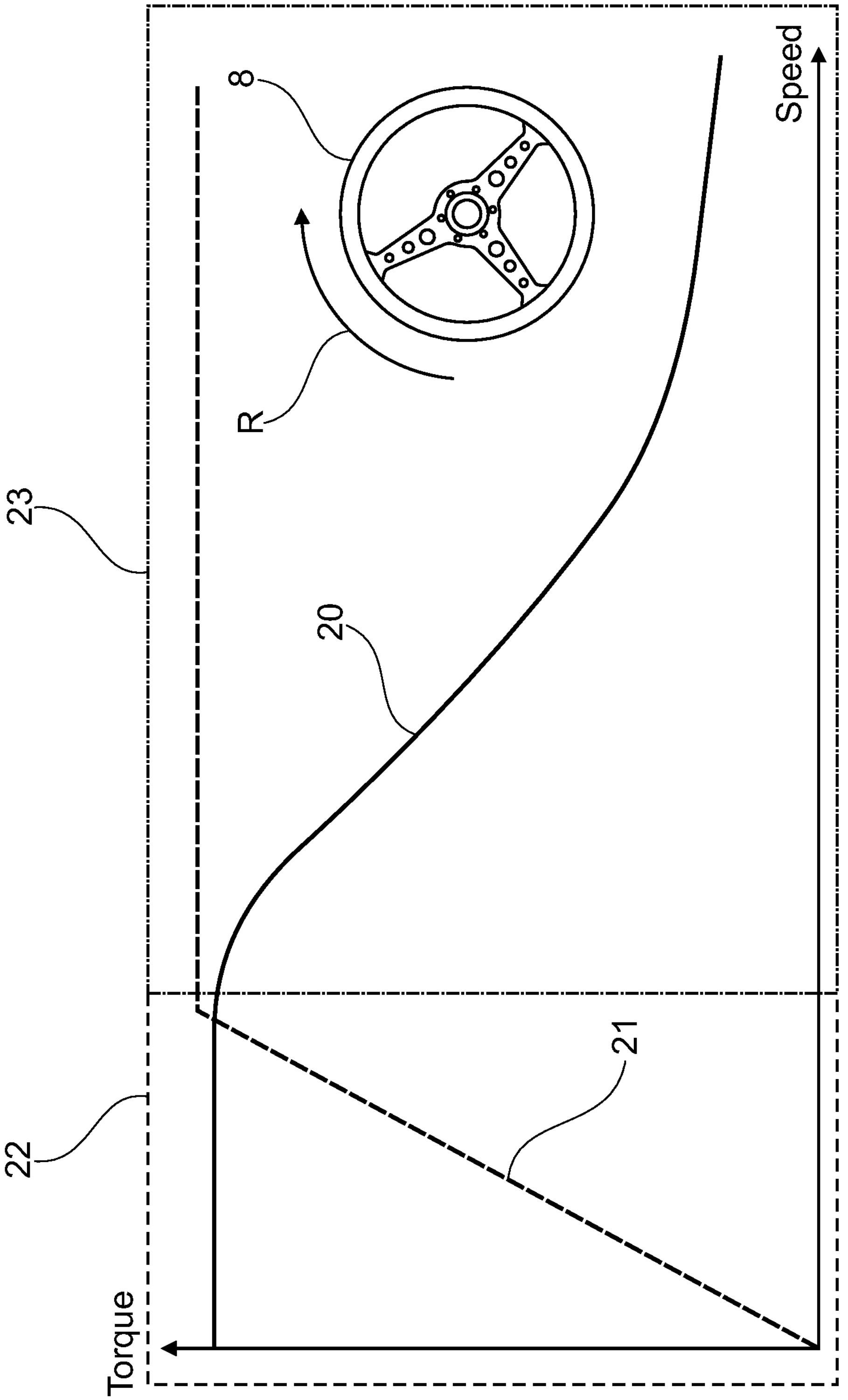
FIG. 4 shows a further torque-speed-graph similar to FIG. 3.

Most of the time, the steering wheel 8 is rotated quite slowly which makes the EPS system 1 operate mostly in the left area 22 of FIG. 4 including the first curve 20. However, during quick maneuvers or during abnormal driving circumstances (such as hitting the side road), the EPS system 1 operates in the right area 23 of the first curve 20. For safety reasons, the EPS system 1 must be able to operate in the motor's complete operating range. For car emission efficiency, the motor 4 must be controlled in the most efficient way, no matter the operating area (even though the EPS system 1 might not be used in the high-speed area that often). Also, the hardware (electric) part of the ECU 3 is designed on the assumption that the EPS system 1 is controlled perfectly (another reason to control the motor 4 as well as possible).

In the left area 22 of FIG. 4, the motor 4 operates in the so-called "normal operating mode". The power depicted as second curve 21 increases linearly, up to a certain speed. From this certain speed in the right area 23, the motor 4 operates in the so-called "flux weakening operating mode", which permits to control the motor 4 in higher speed, for the same power (against losing torque availability).

Figure 5:
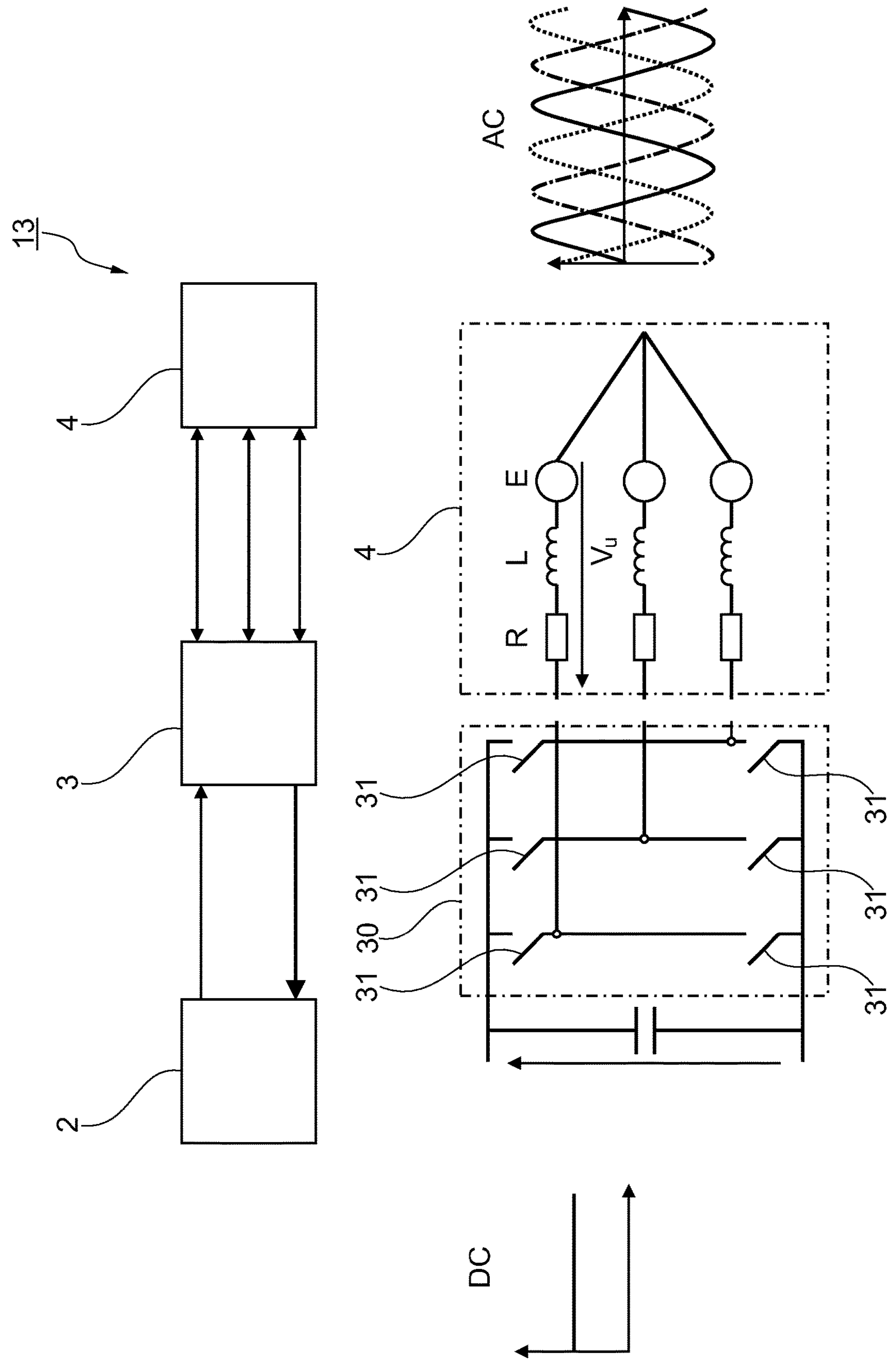
FIG. 5 shows an electric system of the electronic power steering system of FIG. 1.

In FIG. 5, the power stage 30, in this case a 3-phase-inverter, of the ECU 3 having six switches 31 is shown in more detail. The power stage 30 allows to shape the DC voltage from the battery 2 into AC sine shapes to apply on each phase of the motor 4. Each phase of the motor 4 can be represented as a RL circuit in series with a voltage source E. This voltage source E has a sine shape at constant motor speed, and its amplitude increases with the motor speed.

A first objective of the motor control is to apply the right voltage across each phase of the motor 4, making sure the phase-to-phase voltage of the motor 4 does not exceed the voltage of the battery 2. Otherwise, the EPS system 1 would not operate in motor mode but rather in generator mode, which would brake the motor 4 and violate safety goals.

Since the hardware designers consider perfect motor control and certain current during certain amount of time in order to choose the right components and thermal dissipation parameters, it is required to not exceed the maximum current allowed in each phase, which is the second objective.

A third objective of the motor control is to keep as much assistance availability as possible (i.e., not limit the assistance too much). OEMs expect to have certain amount of assistance in certain circumstances which requires the motor control to be able to provide as much torque as the motor 4 can do, otherwise it will result in overdesigning the powerpack 13 to be able to comply with the OEM torque-vs-speed requirements.

A fourth objective is to make the control as efficient as possible (i.e., less current for same power provided).

Basically, the motor control is responsible to control the motor 4 in the most efficient way while adapting to its environment (battery voltage, hardware maximum current), but also to follow the driver assistance expectations and avoid making the vehicle 15 consume more fuel to recharge the battery 2 because of the EPS system 1 excess current consumption.

As explained earlier, the first objective of the motor control is to apply the right voltage across the motor phases (for the right torque) while avoiding to have phase-to-phase voltage greater than the battery voltage. However, the voltage induced by the rotation of the motor (so-called "Back-EMF"; referred to as E in FIG. 5) increases linearly with the motor speed, which makes the phase-to-phase voltage increase.

Figure 6:
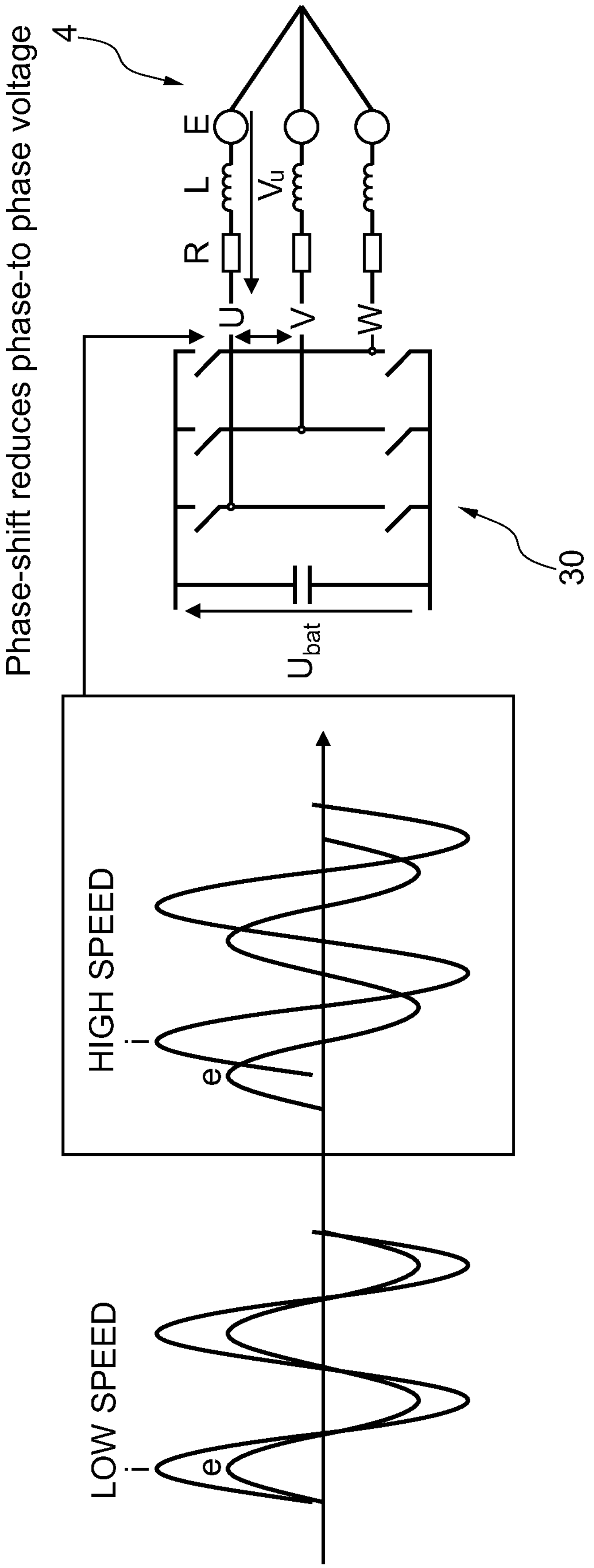
FIG. 6 shows a power stage of the ECU of the electronic power steering system of FIG. 1.

Therefore, as shown in FIG. 6, to avoid an overvoltage, the motor control has the role to induce a phase-shift between the phase current and the phase back-EMF when required (in high speed).

Figure 7:
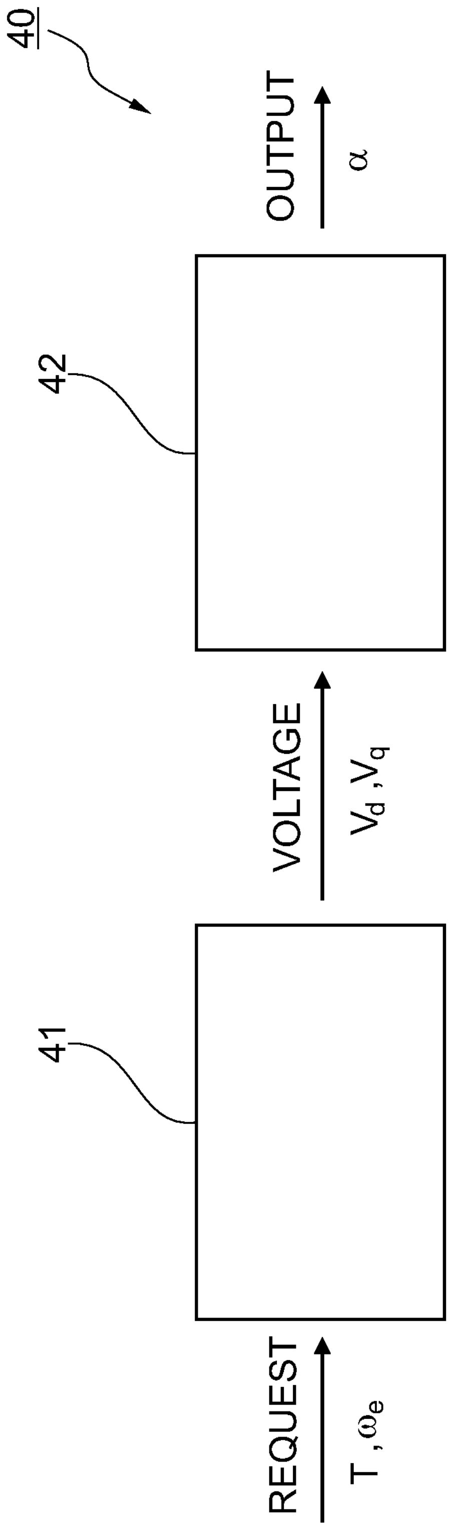
FIG. 7 shows a control system of the electronic power steering system of FIG. 1.

In FIG. 7, the control system 40 for the powerpack 13 is depicted in a simplified way. It may be seen that for a certain torque request and a certain motor speed, a motor control system 41 of the control system 40 will provide voltage ($V_d$, $V_q$) request to have more or less current (for torque T) with more or less phase-shift φ (for phase-to-phase limitation). Then the power stage control system 42 of the control system 40 transforms the voltage request into duty cycles to command the six switches 31 correctly.

Figure 8:
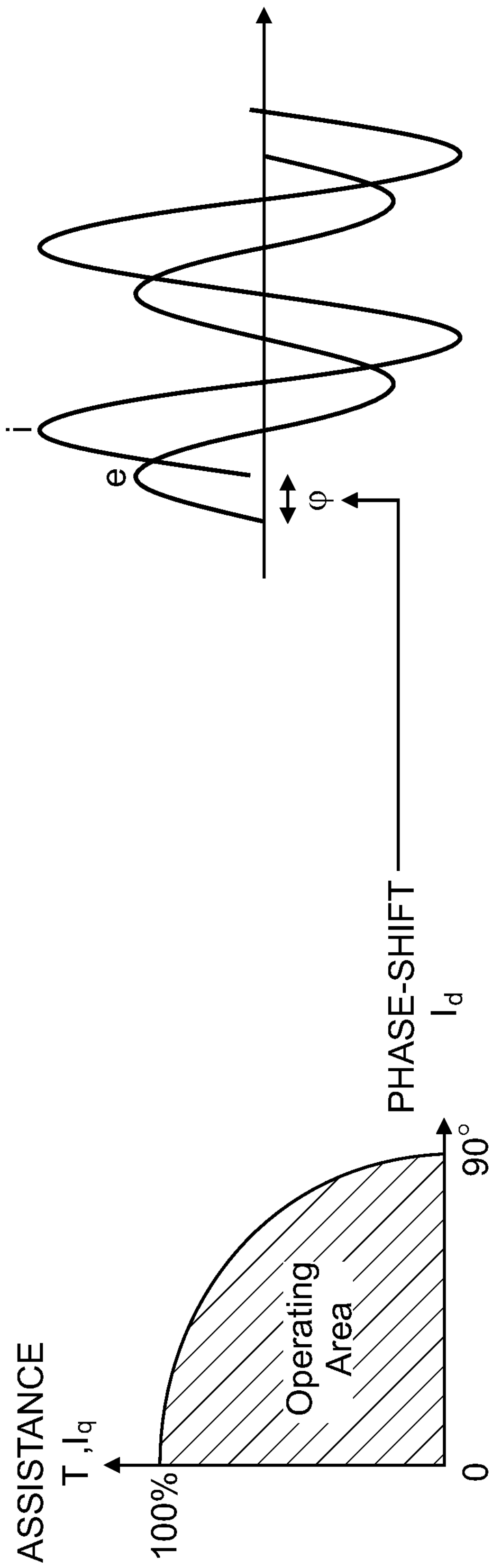
FIG. 8 shows a graph corresponding to the motor control system in the control system of FIG. 7.

Now, as shown in FIG. 8, the motor control system 41 can be represented as a graph with two axes: how much assistance (Y-axis) can be provided in function of the phase-shift (X-axis) induced between the current and the Back-EMF. The assistance is equivalent to how much torque the motor provides [0:100%]. The phase-shift q will never exceed 90 degrees.

To control the motor 4 in a simpler way (less CPU load and better system understanding), the electrical components (voltage, current, phases resistance and inductance) may be represented in a Park plan, which may be obtained after a Clarke and Park transformation. These are constant and rotor angle dependent matrices that are multiplied by the three phase components. They are generally known in the art and to the person skilled in the art. The Park plan permits to represent the three phases sinusoidal current into two constant components $I_q$ and $I_d$. The transition from three-phase (temporal) plan to a Clarke/Park plan permits to represent parameters from stator to rotor point of view.

Using the representation of FIG. 8 of the system 40 showing assistance vs phase-shift as explained before, the component $I_q$ can be associated with how much torque T is provided and the component $I_d$ with how much phase-shift is induced.

Figure 9:
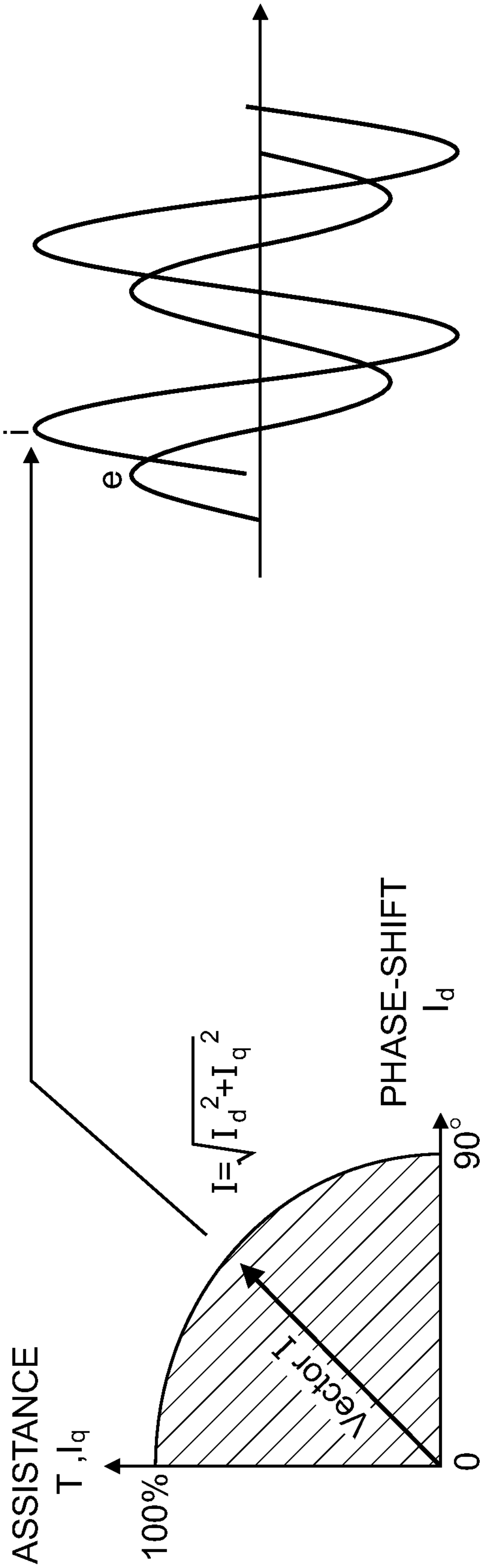
FIG. 9 shows a further graph similar to FIG. 8.

Coming back to the initial issue of handling the phase-to-phase voltage equal or lower than the battery voltage, there also comes the necessity to limit the current flow to what has been expected by the hardware design. The current that flows through each phase of the motor 4 has an amplitude |I| that is equal to the root square of $I_d^2+I_q^2$, as shown in FIG. 9. This is the reason why when applying some phase-shift, the maximum torque/assistance that can be provided is reduced (with this quarter circle shape).

The motor 4 can operate anywhere in the area of the graph of FIG. 9. But if the motor 4 operates outside of it, the current will be higher than what the hardware has been designed for, and this might risk reducing the life of the ECU 3, cause the ECU 3 to dysfunction or even endanger the driver.

Therefore, operating in this area fulfills the second criteria of the motor control's objectives, which is the hardware limitation.

Once again, when increasing the motor speed $\omega_e$, the Back-EMF's "E" amplitude increases, which increases the phase voltage, which increases the phase-to-phase voltage. Now, increasing the current to Back-EMF phase-shift reduces the phase voltage which reduces the phase-to-phase voltage. By combining both effects, a proper motor control can be created.

Figure 10:
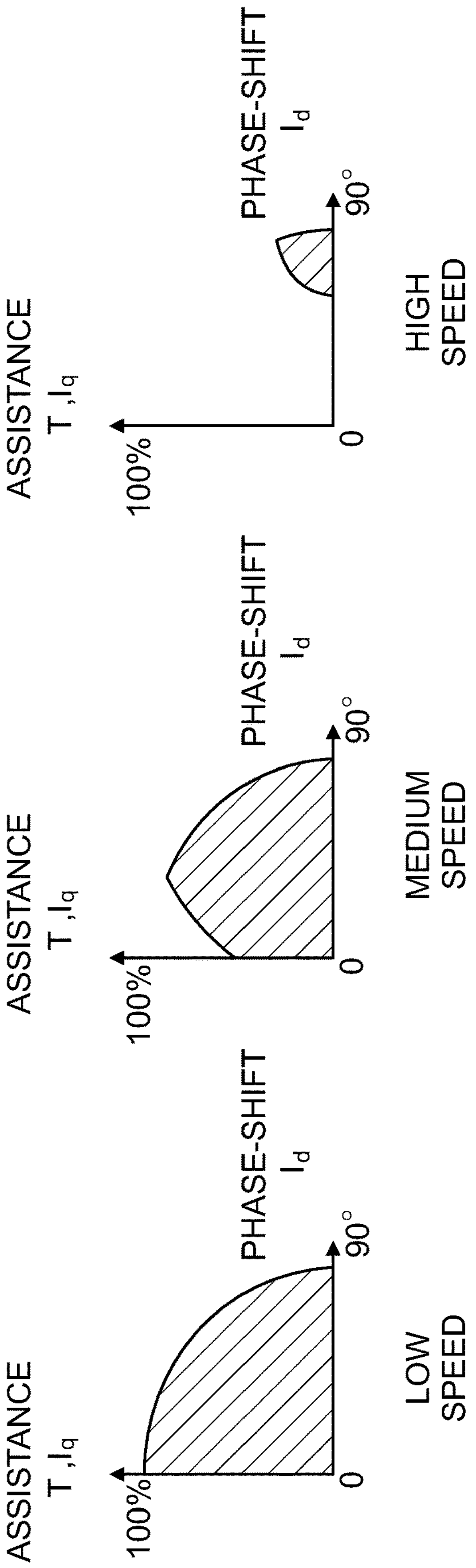
FIG. 10 shows graphs of operating areas for different speeds.
Figure 11:
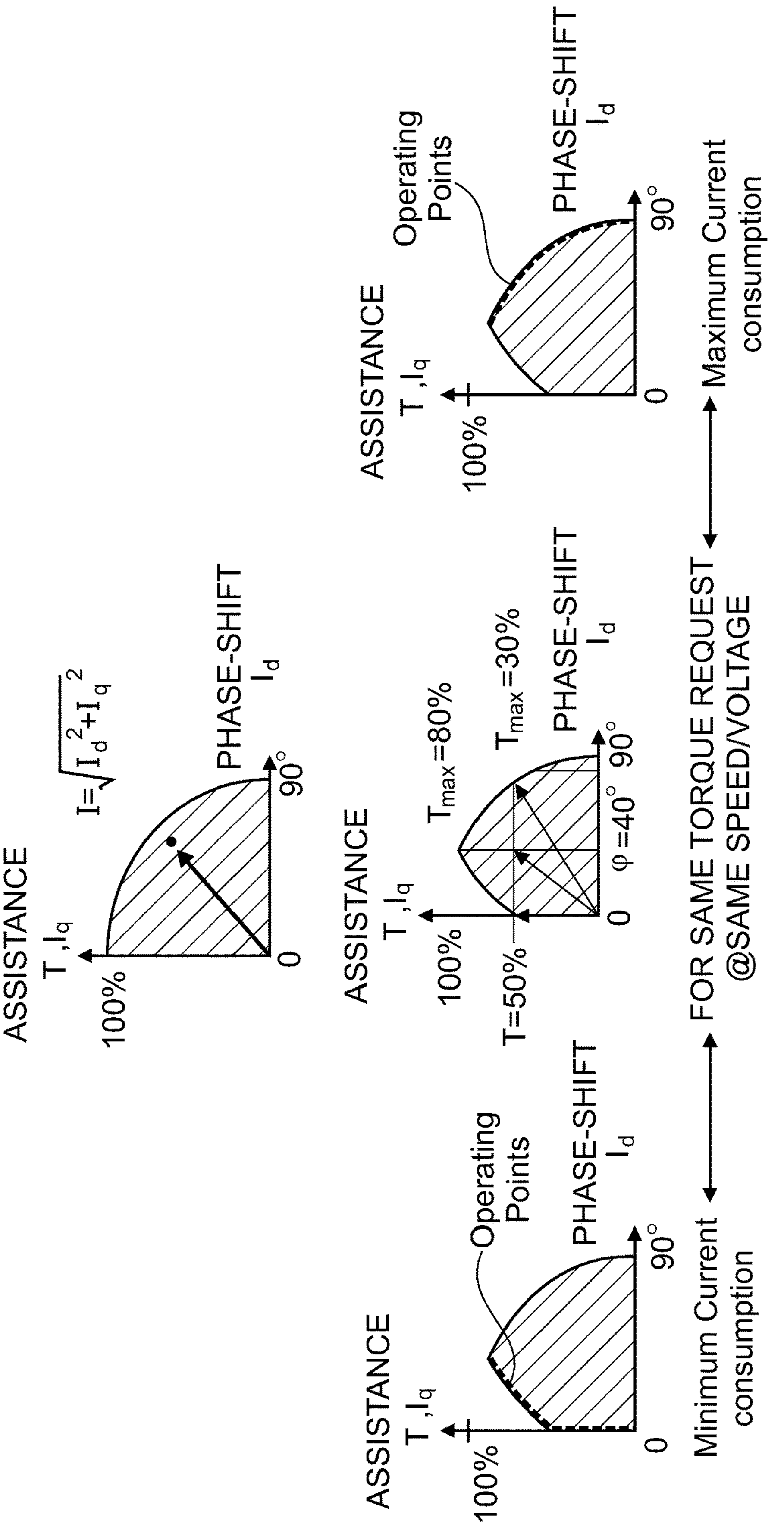
FIG. 11 shows graphs of operating areas for different current consumptions.

Looking at the operating area, depending on the motor speed we as depicted in FIG. 10, it can be seen that the operating area shrinks when the motor 4 runs faster. That is explained by the fact that when the speed is so high that the phase-to-phase voltage is greater than the battery voltage, there is no choice but to apply a phase-shift to avoid going in generator mode (phase-to-phase voltage greater than battery voltage).

Now, from a strategic point of view, it would be possible to provide 80% of the assistance by applying 40° of phase-shift when the driver needs the most assistance, and to increase the phase-shift along with reducing the torque T applied when the driver does not need much assistance. This is depicted on the right graph of FIG. 11 and would make the motor operate 100% of the time at maximum current consumption, which would be the least efficient option in terms of motor control.

Figure 12:
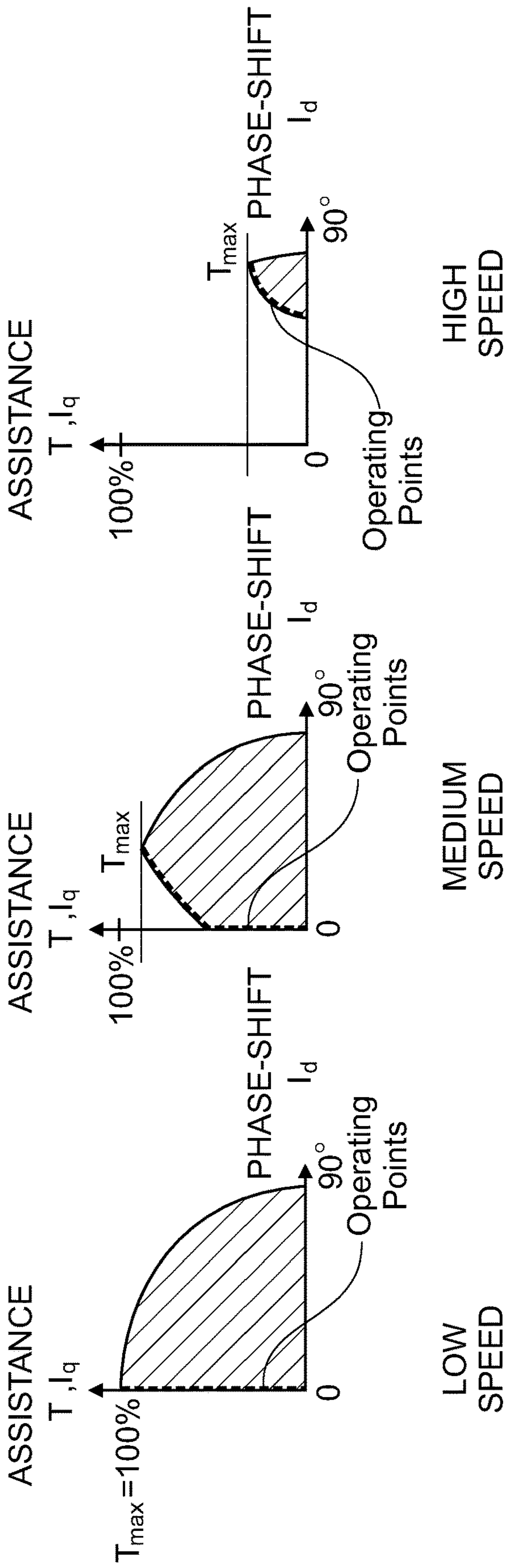
FIG. 12 shows the graphs of FIG. 10 with optimal operating points included.

However, if we were closer to the operation according to the graph on the left of FIG. 12 and provide the point where $I=\text{sqrt}(I_d^2+I_q^2)$ is the minimum, that would be the most efficient way to control the motor 4.

Therefore, by not only operating in the area of the graphs of FIG. 10 for the different speeds, but by operating on the thick lines added to FIG. 10 and represented in FIG. 12, which is the limit where the phase-to-phase peak voltage is equal to the battery voltage, the motor control would fulfill its third and fourth objective, which are to be able to provide as much assistance as possible when needed and be as efficient as possible in terms of current consumption for the same result/assistance.

Now, adding a last difficulty in the motor control: Batteries 2 are never charged at the same level throughout the life of the vehicle 15. Sometimes, the headlamps are on, as well as the radio and other electrical modules which reduce the battery voltage. Other times, the battery 2 is completely charged and the motor 4 together with the alternator recharge the battery 2 which makes its voltage very high. The weather also affects the temperature of the battery 2, which also affects its voltage. All of this has to be considered.

Figure 13:
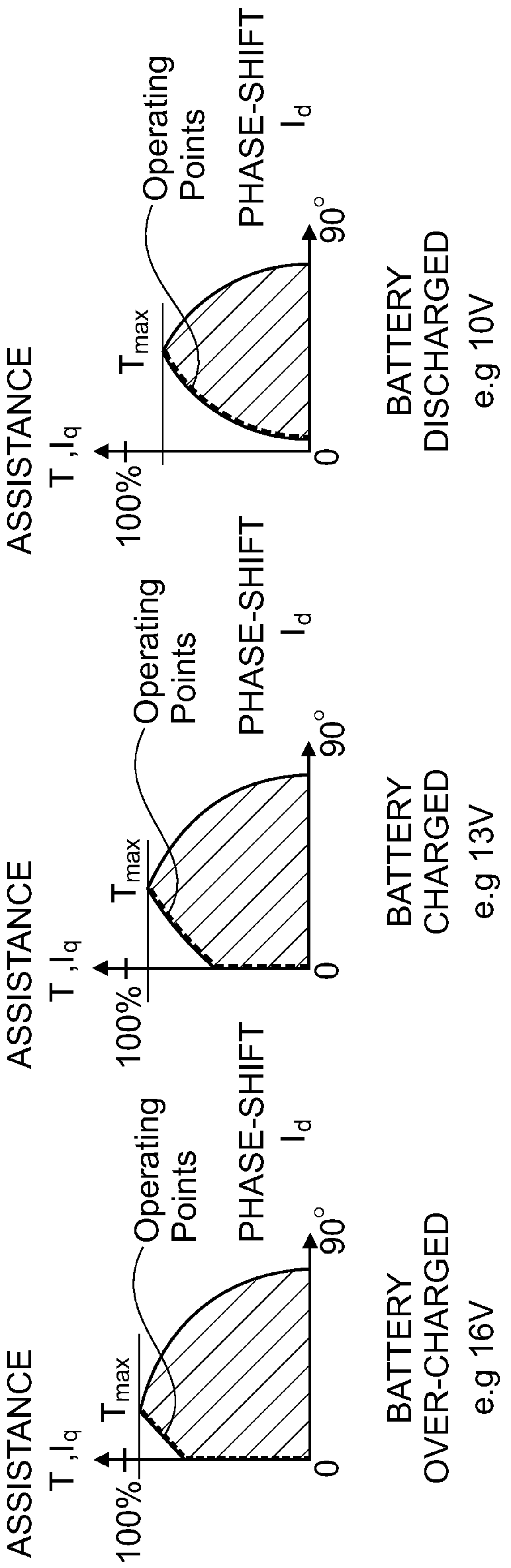
FIG. 13 shows graphs of operating areas with optimal operating points included and for different charge levels of the battery.

FIG. 13 gives a closer look to the effect of the battery voltage on the operating area of the motor control (for the same speed, here at medium speed). It can be seen that the operating area shrinks when the battery voltage decreases, which gives completely new optimal operating points.

Figure 14:
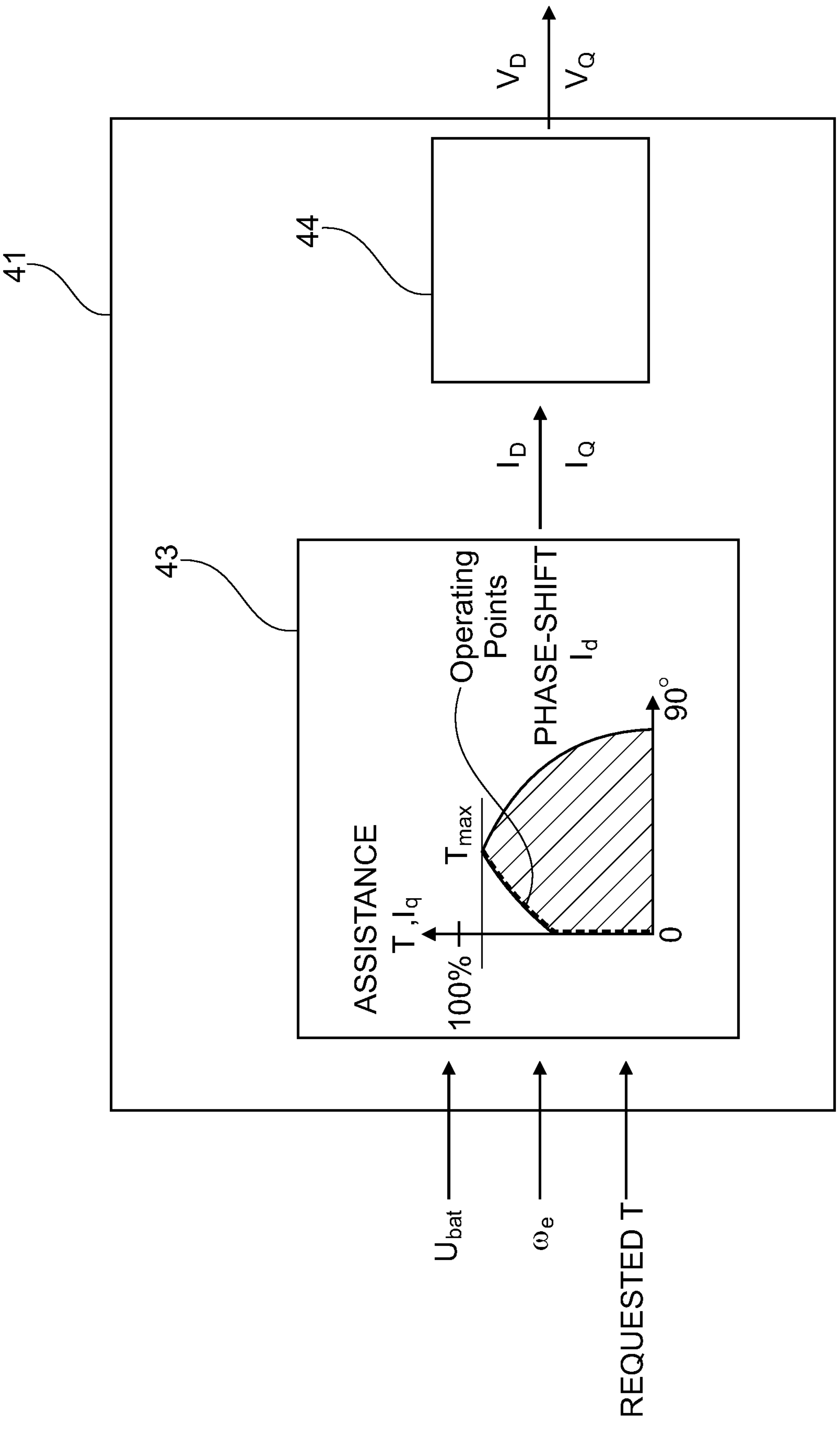
FIG. 14 shows a motor control system for the control system of FIG. 7.
Figure 15:
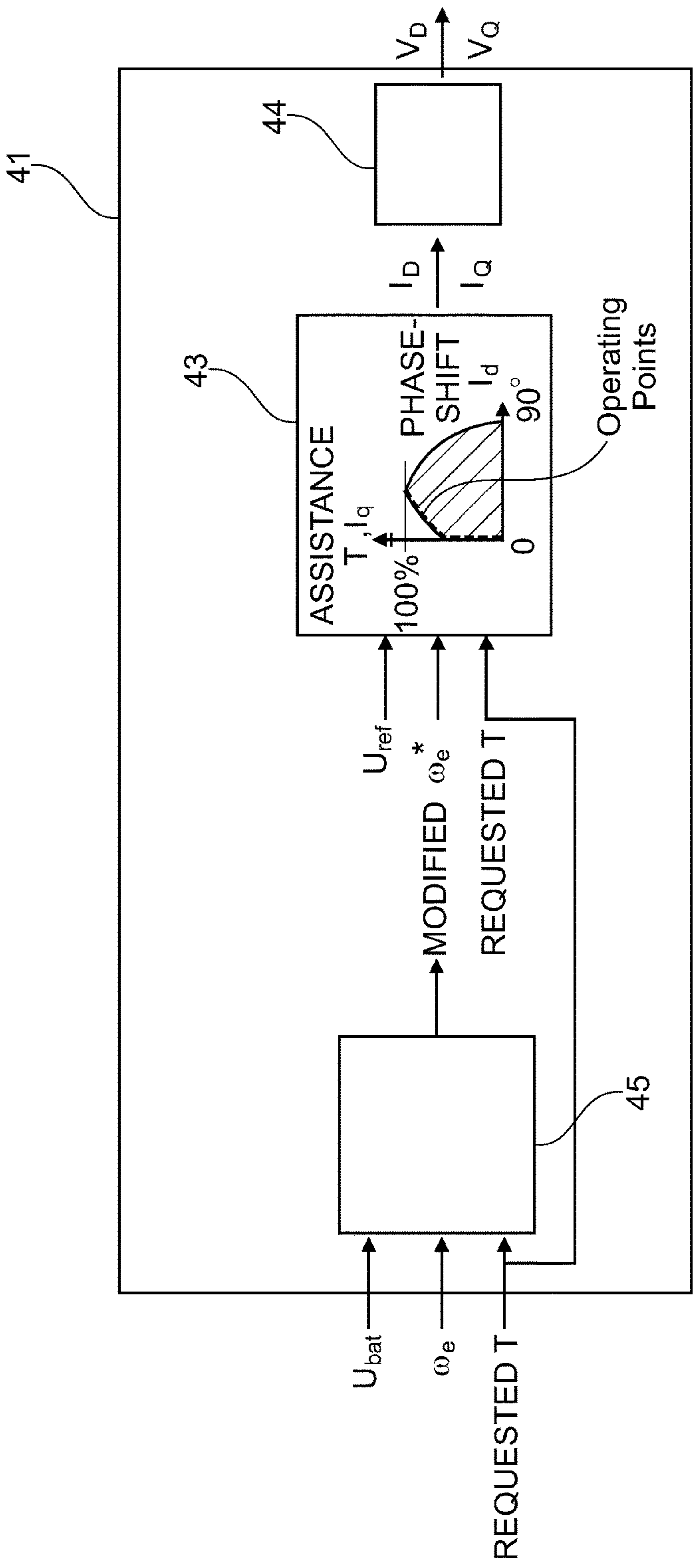
FIG. 15 shows a further motor control system for the control system of FIG. 7.

FIG. 14 now gives a detailed schematic illustration of a motor control system 41, which may be used in the control system 40 of FIG. 7. It can be seen that the operating point controller (OPC) 43 in fact depends on three inputs: the torque T request (for the assistance), the rotor speed we and the battery voltage measured (for the right phase-shift). The OPC 43 provides requests of current $I_D$, $I_Q$ to be applied through each phase, and a regulator/control loop 44 will compare it to the measured current and give voltage requests in the output (for the power stage control 42, see FIG. 7).

Focusing on the OPC 43, the equations for "perfect" motor control require four dimensional/parameters (current, voltage, speed, torque) equations. Now taking into consideration the automotive industry application, the central processing unit (CPU) of the ECU 3, which contains all the numeric motor systems, does not have much memory and does not have a very high operating frequency (much less than a computer processor). Therefore, it is required to simplify algorithms and to find balance between memory and CPU load.

According to the invention, the OPC 43 is now designed for only one reference battery voltage (e.g., 13 V since it is the typical battery voltage when it is charged) to make the OPC 43 a 3-dimensional equations algorithm instead of a 4-dimensional one.

In addition to that, a calibrator 45 is added upstream of the OPC 43 to adjust its input speed in function of the real motor control inputs, so that it will shift the operating points when the battery voltage is higher or lower than the reference one.

Figure 16:
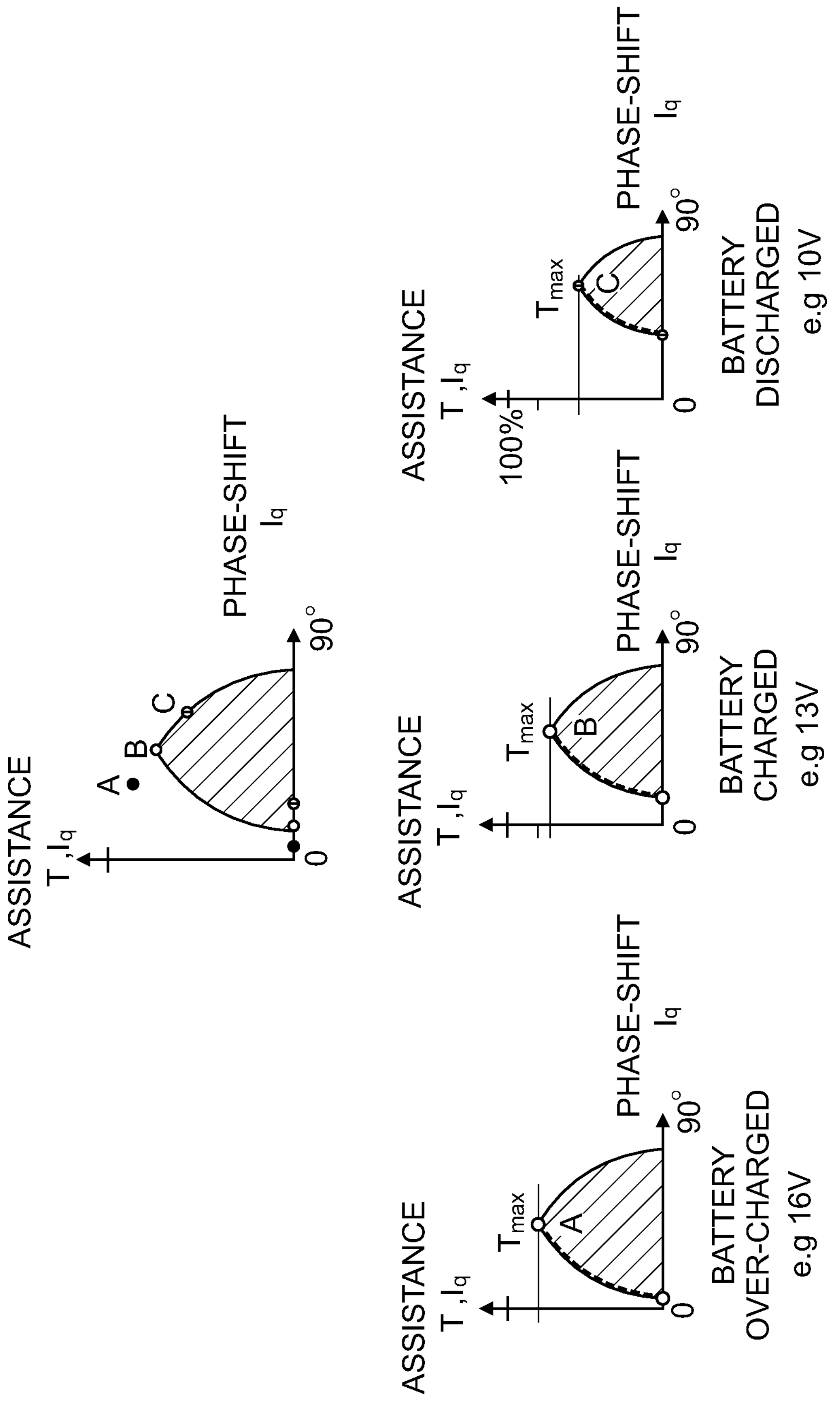
FIG. 16 shows further graphs of operating areas for different charge levels of the battery.

To have an example, it is referred to FIG. 16. It is assumed that speed is constant (in the medium range in the example of FIG. 16). The operating area for several battery voltages is represented. It can be seen that it shrinks when the voltage is lower (as already mentioned before).

But the most important part is that the optimal operating points are completely different (thick lines as before). Representing them on the same figure (as above), the objective of the calibrator 45 is to make the operating point B closer to the operating point A and C when the battery voltage is respectively higher or lower than the reference battery (13 V in this example) because the OPC 43 was designed for only this reference B.

It can be said that FIG. 16 corresponds to the OPC 43 operating area for the reference voltage 13 V. When the voltage is higher, the calibrator 45 has to make the OPC's 43 input speed lower so that its operating area will increase and the point B will be closer to A (which is the optimum). Same principle applies for lower battery voltage.

The OPC's 43 input speed $\omega_e$* is calculated by the calibrator 45 by making a ratio between the reference voltage $U_{ref}$ and the battery voltage $U_{bat}$ and doing a linearization in function of the actual speed and this ratio.

The typical equations to control a motor 4 are the following ones:

Voltage $$V_d = i_d \cdot r - i_q \cdot L_q \cdot \omega_e$$

$$V_q = i_q \cdot r + i_d \cdot L_d \cdot \omega_e + \frac{K_e}{p} \cdot \omega_e$$

$$\sqrt{V_d^2 + V_q^2} \le V_{max} = \frac{U_{bat}}{\sqrt{3}}$$

Current Limit $$\sqrt{i_d^2 + i_q^2} \le I_{max}$$

Torque $$T = \frac{3}{2} \cdot p \cdot i_1 \cdot (\varphi_m + (L_d - L_q) \cdot i_d)$$

The state of the art is to make a Clarke/Park transformation of the electrical circuit of the motor phases to represent it in a two-component d and q plan. Adding all the voltage and current limitations, in addition to the torque/currents relation, these equations are obtained.

The calibrator 45 principle proposed herein consists in modifying these equations by making a variable change of the speed we (replaced by the more complex equation for $\omega_e$*) and by fixing the battery voltage to a constant $U_{ref}$. Accordingly, make a variable change of $\omega_e$ and set $U_{bat}$ to a reference voltage $U_{ref}$:

Voltage $$V_d = i_d \cdot r - i_q \cdot L_q \cdot w_e^*$$

$$V_q = i_q \cdot r + i_d \cdot L_d \cdot w_e^* + \frac{K_e}{p} \cdot w_e^*$$

$$w_e^* = f(\omega_e, U_{bat})$$

$$\sqrt{V_d^2 + V_q^2} \le V_{max} = \frac{U_{ref}}{\sqrt{3}}$$

Other motor control methods consist in neglecting the phases resistance and controlling the motor in flux instead of voltages.

Flux $$\varphi_d = i_q \cdot L_q$$

$$\varphi_q = i_d \cdot L_d + \varphi_m$$

$$\sqrt{\varphi_d^2 + \varphi_q^2} \le \varphi_{max} = \frac{U_{bat}}{\sqrt{3} \cdot \omega_e}$$

It is proposed to make a variable change of $\omega_e$ and set $U_{bat}$ to the reference voltage $U_{ref}$.

$$\sqrt{\varphi_d^2 + \varphi_q^2} \le \varphi_{max} = \frac{U_{ref}}{\sqrt{3} \cdot \omega_e^*}$$

The calibrator 45 operates exactly the same way since the flux is calculated in the input of the OPC 43 by dividing the voltage by the speed. Therefore, calibrating the speed also calibrates the flux.

LIST OF REFERENCE SIGNS

1 electronic (vehicle) system, electronic power steering system
2 battery
3 electronic control unit
4 electric motor
5 gearbox
6 motor position sensor
7 torque sensor
8 steering wheel
9 column
10 pinion
11 rack
12 wheel
13 electric system, powerpack
14 mechanical system
15 vehicle

20 first curve
21 second curve
22 left area
23 right area
30 power stage
31 switch
40 control system
41 motor control system
42 power stage control system
43 operating point controller, OPC
44 regulator/control loop
45 calibrator
100 Method

I claim:

1. A motor control system for determining an operating point for controlling an electric motor in an electric system having a battery and an electronic control unit, the motor control system comprising:

a calibrator having an input for receiving a battery voltage ($U_{bat}$) of the battery, a motor speed ($\omega_e$) and a requested torque (T) of the electric motor, the calibrator calculating a modified speed ($\omega_e$*) based on the received battery voltage ($U_{bat}$), the motor speed ($\omega_e$) and the requested torque (T);

an operating point controller having an input for receiving a fixed battery voltage reference ($U_{ref}$), the modified speed ($\omega_e$*) and the requested torque (T), the operating point controller determining the operating point for controlling the electric motor based on the received fixed battery voltage reference ($U_{ref}$), the modified speed ($\omega_e$*) and the requested torque (T);

wherein the operating point is defined by a current ($I_d$, $I_q$) to be applied through each of the phases of the electric motor; and further comprising a control loop receiving the determined operating point, and comparing the determined operating point to a measured current and output a voltage ($V_d$, $V_q$) request.

2. The motor control system according to claim 1, wherein the electric motor is a brushless alternating current motor.

3. A motor control system for determining an operating point for controlling an electric motor in an electric system having a battery and an electronic control unit, the motor control system comprising:

a calibrator having an input for receiving a battery voltage (Ubat) of the battery, a motor speed (ωe) and a requested torque (T) of the electric motor, the calibrator calculating a modified speed (ωe*) based on the received battery voltage (Ubat), the motor speed (ωe) and the requested torque (T); and an operating point controller having an input for receiving a fixed battery voltage reference (Uref), the modified speed (ωe*) and the requested torque (T), the operating point controller determining the operating point for controlling the electric motor based on the received fixed battery voltage reference (Uref), the modified speed (ωe*) and the requested torque (T);

wherein the control system further comprises a power stage control system connected to the motor control system; and wherein the power stage control system transforms a voltage ($V_d$, $V_q$) request received from the motor control system into duty cycles (a) to command switches of a power stage of the electronic control unit.

4. An electronic system comprising a mechanical system and an electric system, the electric system having the control system according to claim 3.

5. The electronic system according to claim 4, wherein the electronic system is an electronic vehicle system.

6. The electronic system according to claim 4, wherein the electronic system is an electronic power steering system.

7. A vehicle comprising the electronic system according to claim 4.

8. A method for determining an operating point for controlling an electric motor in an electric system that includes a battery and an electronic control unit, the method comprising the steps of:

receiving a battery voltage ($U_{bat}$) of the battery, a motor speed ($\omega_e$) and a requested torque (T) of the electric motor;

calculating a modified speed ($\omega_e$*) based on the received battery voltage ($U_{bat}$), motor speed ($\omega_e$) and requested torque (T);

receiving a fixed battery voltage reference ($U_{ref}$), the modified speed ($\omega_e$*) and a requested torque (T);

determining the operating point for controlling the electric motor based on the received fixed battery voltage reference ($U_{ref}$), the modified speed ($\omega_e$*) and the requested torque (T); and comparing the determined operating point to a measured current and outputting a voltage ($V_d$, $V_q$) request.

9. A computer program stored on non-transitory computer readable media and including instructions which, when executed by a processor, cause a computer to carry out the method of claim 8.

10. The computer-readable data carrier having stored thereon the computer program of claim 9.

11. A method for determining an operating point for controlling an electric motor in an electric system that includes a battery and an electronic control unit, the method comprising the steps of:

receiving a battery voltage ($U_{bat}$) of the battery, a motor speed ($\omega_e$) and a requested torque (T) of the electric motor;

calculating a modified speed ($\omega_e$*) based on the received battery voltage ($U_{bat}$), motor speed ($\omega_e$) and requested torque (T);

receiving a fixed battery voltage reference ($U_{ref}$), the modified speed ($\omega_e$*) and a requested torque (T);

determining the operating point for controlling the electric motor based on the received fixed battery voltage reference ($U_{ref}$), the modified speed ($\omega_e$) and the requested torque (T); and transforming a voltage ($V_d$, $V_q$) request into duty cycles (α) and correspondingly commanding switches of a power stage of the electronic control unit.

* * * * *